Patented June 13, 1944

2,351,133

UNITED STATES PATENT OFFICE 2,351,133

MONOAZO DYESTUFF

Arthur Howard Knight, Blackley, Manchester, England, assignor to Imperial Chemical Industries Limited, a corporation of Great Britain No Drawing. Application December 22, 1938, Serial No. 247,209. In Great Britain December 28, 1937

6 Claims. (Cl. 260—205)

The present invention relates to new water-soluble monoazo dyestuffs which are especially useful for the dyeing and printing of acetate artificial silk.

According to the invention we make the dyestuffs by combining a diazotised p-nitro-arylamine of the benzene series, devoid of sulpho and carboxyl groups, with either (1) an amine of the benzene series having a free coupling position and of the general type

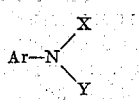

wherein the aryl radical of the benzene series may be further substituted, X is alkyl, hydroxyalkyl, aryl, aralkyl or cycloalkyl, and Y is an esterified hydroxyalkyl group, the ester residue being that of a carboxylic acid, one carboxylic acid group of which is unesterified, which dicarboxylic acid is either maleic acid, or an aliphatic acid of general formula $HO_2C.C_nH_{2n}.CO_2H$, where $C_nH_{2n}$ is a straight- or branched-chain hydrocarbon radical containing from 2 to 6 carbon atoms, or (2) with a mono-ester of a 3-hydroxy-1:2:3:4-tetrahydroquinoline derivative represented by the general formula

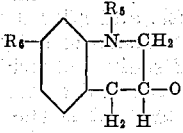

wherein $R_5$ is alkyl or aralkyl and $R_6$ is hydrogen, alkyl, or halogen and the acid radical of said ester is a dicarboxylic acid as above defined. Also according to the invention we make the dyestuffs by converting monoazo intermediate compounds, which contain hydroxyalkyl radicals and which are further defined below, to mono esters of the dicarboxylic acids defined above, by interacting them with anhydrides of the said dicarboxylic acids. The monoazo intermediate compounds are compounds obtainable by combining a diazotised p-nitro-arylamine of the benzene series, devoid of sulpho and carboxyl groups with either (1) an amine of the benzene series having a free coupling position and of the general type

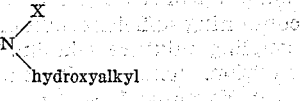

wherein X is the same as above and the aryl radical of the benzene series may be further substituted, or (2) a 3-hydroxy-1:2:3:4-tetrahydroquinoline derivative of general formula the same as that given above. Also according to the invention we apply the new dyestuffs in the dyeing and printing of acetate artificial silk.

The new dyestuffs, in the form of their alkali metal, ammonium or other soluble salts dissolve in warm water. They have good affinity for acetate artificial silk when dyed from a neutral dyebath containing a small proportion of a soluble salt, for example sodium chloride. They are also eminently suitable for the printing of acetate artificial silk. In comparison with the corresponding water-soluble dyestuffs of British Specification No. 237,739 and U. S. Patents No. 2,057,685, No. 2,092,075 and No. 2,131,894 derived from coupling components which are sulphuric esters of N-hydroxyalkyl derivatives of amines of the benzene series having a free position para to the amino groups, the new dyestuffs have superior printing properties in that they give better tinctorial value and yield stronger shades than are given by the dyestuffs of the said specification and patents when applied to acetate artificial silk under dry steaming conditions such as are frequently found in textile printing practice. By dry steam we mean steam the temperature of which is higher than the boiling point of water at the particular pressure obtaining in the steamer. By means of the new dyestuffs, acetate artificial silk may be colored in yellowish-red, crimson, violet, blue, orange-brown and reddish-brown shades as well as in shades intermediate between those mentioned.

The ester coupling component employed according to this invention may be obtained by esterifying the corresponding N-hydroxy-alkyl derivatives or 3-hydroxy-1:2:3:4-tetra-hydroquinolines so that half-esters are formed. For example the N-hydroxyalkyl compound can be reacted with substantially an equimolecular proportion of the anhydride of the appropriate dicarboxylic acid in an inert solvent (e. g. dry pyridine or dry toluene) at an elevated temperature, and the solvent then removed. The ester obtained by this method of esterification is in many cases sufficiently pure to be used for dyestuff preparations forthwith, but in some cases it is desirable to treat the crude esterification product with aqueous alkali to form the salt of the desired mono-ester and then extract the aqueous solution so-obtained with a solvent such as ether to remove any unchanged N-hydroxyalkyl compound or 3-hydroxy-1:2:3:4-tetrahydroquinoline derivative. The resulting aqueous solutions can then be used for coupling.

The conversion of the above-defined N-hydroxyalkylated monoazo intermediate compounds into their monoesters is conveniently effected by treating together approximately equimolecular proportions of the above defined anhydrides and the monoazo intermediate compounds in a suitable liquid inert solvent or diluent (e. g. dry pyridine, or dry toluene) at an elevated temperature.

The term inert solvent, diluent or medium as used in the specification and claims refers to compounds which do not react with the reagents involved in the reaction. Many such compounds are known to the art such as pyridine, toluene, tetrachlorethane and others.

The invention is illustrated, but not limited, by the following examples, in which the parts are by weight.

Example 1

13.8 parts of p-nitroaniline are diazotized in the known way and the diazo solution so obtained is added to a cooled aqueous solution of 28.7 parts of the sodium salt of the succinic half-ester of N-ethyl-β-hydroxyethylaniline containing sufficient sodium carbonate to keep the coupling mixture alkaline to litmus during the addition. Coupling is rapid and the new dyestuff is isolated by adding 1 kilogram of sodium chloride to each 10 litres of the coupling mixture and filtering. The dyestuff is then dried.

The compound is represented by the formula

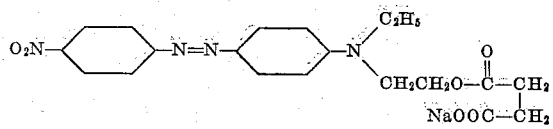

It is reddish-brown in color and dissolves in warm water to a reddish color. It dyes acetate artificial silk from a neutral dyebath containing 1% of sodium chloride, in scarlet shades of good fastness properties. It also yields scarlet prints on acetate artificial silk, of good fastness to soaping and light.

A similar dyestuff to the above can be made by substituting the corresponding glutaric ester for the succinic ester in the above process.

Example 2

13.8 parts of p-nitroaniline are diazotised in the known way and the diazo solution so-obtained is added to a cooled aqueous solution of 30 parts of the succinic half-ester of 1-N-ethyl-3-hydroxy-1:2:3:4-tetrahydroquinoline containing enough sodium carbonate to keep the coupling mixture alkaline to litmus during the addition. The dyestuff is isolated and dried as in Example 1 and is represented by the formula

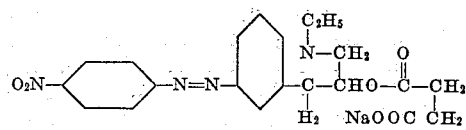

The dry dyestuff is reddish-brown in colour and dissolves in water with a red colour. It dyes acetate artificial silk from a neutral dyebath containing 2% of sodium chloride in red shades of good fastness properties.

Other compounds having similar properties are made by using equivalent proportions of succinic acid half-esters of other 3-hydroxy-1,2,3,4-tetrahydroquinolines in Example 2 instead of the one specified, such as the succinic acid half-ester of 1 - N -benzyl-3-hydroxy-1,2,3,4-tetrahydroquinoline, 1-N-butyl-3-hydroxy-1,2,3,4-tetrahydroquinoline. Other modifications are made by using equivalent proportions of half-esters of other dicarboxylic acids, such as the maleic acid half-ester of 1-N-butyl-1,2,3,4-tetrahydroquinoline, the glutaric acid or adipic acid half-esters of 1-N-ethyl-3-hydroxy-1,2,3,4 - tetrahydroquinoline and many other compounds derived from the class indicated by the following general formula can be used

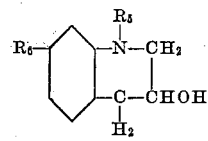

wherein $R_5$ is alkyl or aralkyl and $R_6$ is hydrogen, alkyl or halogen.

Example 3

13.8 parts of p-nitroaniline are diazotised in the known way and the diazo solution so-obtained is added to a cooled aqueous solution of 28.6 parts of the sodium salt of the maleic-half-ester of N-ethyl-N-β-hydroxyethyl-aniline containing sufficient sodium carbonate to keep the coupling medium alkaline to litmus during the addition. The dyestuff is isolated and dried as in Example 1. The compound is represented by a formula similar to the compound of Example 1, except that the acid group of the ester is the residue of maleic acid instead of succinic acid.

It can be used in dyeing in the same way as the dyestuff of Example 1 and gives very similar scarlet dyestuffs.

Example 4

5.45 parts of the monoazo compound p-nitroaniline→N - ethyl - N-β-hydroxyethylaniline are dissolved in 100 parts of dry tetrachloroethane and 1.35 parts of maleic anhydride then added to the resulting solution. The mixture is heated at about 120° C. for 5 hours. On cooling the dyestuff separated out as the free acid. It is filtered off, made into a suspension in 100 parts of water and this suspension made alkaline with sodium carbonate, and stirred for some time to complete the conversion of the acid to its sodium salt. 5 parts of sodium chloride are added and the dyestuff filtered and dried. A good yield is obtained. The dyestuff is the same as that of Example 3, and is represented by the formula

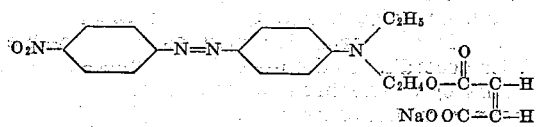

Any of the compounds of the invention can be made by the described modified process.

Example 5

17.25 parts of o-chloro-p-nitroaniline are diazotized in the known way and the diazo solution so obtained is added to a cooled aqueous solution of 28.7 parts of the sodium salt of the succinic half-ester of N-ethyl-N-beta-hydroxyethylaniline containing sufficient sodium carbonate to keep the coupling mixture alkaline to litmus during the addition. The new dyestuff is isolated and dried as in Example 1, and dyes like the dyestuffs of Examples 1 and 3, but in bluish-red shades of very good fastness to light. The compound is represented by the formula

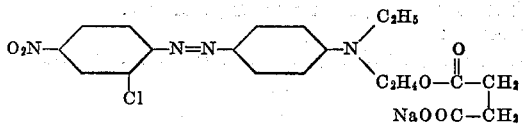

Example 6

The following printing mixture is prepared by dissolving 1 part of the dyestuff of Example 4 and 1 part of the sodium salt of NN-dibenzyl-sulphanilic acid in 5 parts of glycerine and 33 parts of water, and stirring the resulting solution into 60 parts of a gum tragacanth or other suitable thickening, which has been previously made slightly alkaline with ammonia. This mixture is then printed on white acetate artificial silk material, the material dried and then steamed in an atmosphere of steam at 100 C. for half to one hour. It is then washed in water to remove the thickening and dried. A bright bluish-red print is produced which has good fastness to soaping and very good fastness to light.

The above conditions are satisfactory for obtaining high tinctorial value from the above dyestuff, but even under less favorable steaming conditions in which a drier steam (i. e. less saturated) is used a high tinctorial value is still obtained. The dyestuff shows less variation in tinctorial value and the somewhat similar water-soluble dyestuff of line 50, page 4, of British Specification No. 237,739 when the two are subjected side by side to variable steaming conditions.

Example 7

13.8 parts of p-nitroaniline are diazotized in the known way and the diazo solution so obtained is added to a cooled aqueous solution of 31.5 parts of the sodium salt of the adipic ester of N-ethyl-β-hydroxyethylaniline containing sufficient sodium carbonate to keep the coupling mixture alkaline to litmus during the addition. The dyestuff suspension is treated with 10% aqueous sodium chloride solution (weight for volume), the dyestuff filtered off and preserved as paste or dried in any suitable way. It dyes acetate artificial silk in yellowish-red shades of good fastness properties.

Example 8

21.75 parts of 6-chloro-2:4-dinitroaniline are diazotized in the known way by addition to a solution of 6.9 parts of sodium nitrite in 160 parts of concentrated sulphuric and heating the resulting solution at 50–55° C. for about 2 hours followed by cooling to 25° C. The solution is then slowly added to an ice-cold solution of 28.7 parts of the sodium salt of the succinic ester of N-ethyl-β-hydroxyethylaniline, with simultaneous addition of 40% aqueous sodium hydroxide solution to keep the coupling mixture only just acid to Congo red paper and ice to keep the temperature at or below 0° C. Coupling is rapid. The new dyestuff is filtered off, resuspended in 600 parts of water, the suspension rendered alkaline with sodium carbonate and, after stirring for some time to complete the conversion of the dyestuff into its sodium salt, the latter is filtered off and dried. It dyes acetate artificial silk in reddish-violet shades.

Example 9

5.45 parts of the monoazo compound p-nitroaniline→N-ethyl-N-β-hydroxyethylaniline are dissolved in 100 parts of dry tetrachloroethane and 1.35 parts of maleic anhydride then added to the resulting solution. The mixture is heated at about 120° C. for 5 hours. On cooling the dyestuff separated out as the free acid. It is filtered off, made into a suspension in 100 parts of water and this suspension made alkaline with sodium carbonate, and stirred for some time to complete the conversion of the acid to its sodium salt. 5 parts of sodium chloride are added and the dyestuff filtered and dried. A good yield is obtained. The dyestuff is the same as that of Example 3 of the specification mentioned above.

Example 10

5 parts of the monoazo compound 2:4-dinitroaniline→N-n-butyl-N-β-hydroxyethyl - m - toluidine are dissolved in 30 parts of dry pyridine and 1.35 parts of succinic anhydride then added. The mixture is heated at 120° C. for 3 hours, 50 parts of water then added and the pyridine removed by steam distillation. The esterified dyestuff, which is in gelatinous form, is then converted to its sodium salt by stirring it into water at 50° C. making alkaline by adding a slight excess of sodium carbonate, cooling to ordinary temperature and precipitating the dyestuff by adding 5 kg. of sodium chloride to every 100 litres of the mixture and filtering. It is then dried at a moderate temperature. It dyes acetate artificial silk in reddish-violet shades.

Example 11

A dyebath is prepared as follows:

0.5 part of the sodium salt of the compound 6-chloro-2:4-dinitroaniline→N-β-hydroxyethyl - N-n-butyl-m-toluidine succinic ester are dissolved in 500 parts of hot water and the solution diluted with hot water to give a total of 3000 parts. The temperature is adjusted to 80° C. and 10 parts of sodium chloride are added.

100 parts of acetate artificial silk yarn are scoured for 15 minutes at 15° C. in 3000 parts of water containing 3 parts of neutral soap and 3 parts of ammonia, sp. gr. 0.88, well mixed in water and then put into the above dyebath. After dyeing for 15 minutes at 80–85° C., 10 parts of sodium chloride are added, then after dyeing for another 15 minutes at the same temperature another 10 parts of sodium chloride are added. The yarn is well turned during dyeing and at the end is removed from the dyebath, rinsed and dried. The yarn is colored in bluish-violet shades of good fastness properties.

Example 12

A dyestuff printing paste is prepared as follows:

| | Parts |
|---|---|
| The dyestuff of Example 1 | 1.2 |
| The sodium salt of NN-dibenzyl-sulphanilic acid | 2.0 |
| Water | 24.8 |
| Gum thickening (25% and made slightly alkaline with ammonia) | 55.0 |
| Perminal KB (Perminal is a registered trade-mark) | 2.0 |
| Methylated spirits (50% aqueous solution) | 5.0 |

The paste is printed on acetate artificial silk and the material, after drying, steamed with a dry steam at 107° C. for half to one hour. It is then washed in water to remove the thickening and dried. A bright scarlet print is obtained of good fastness to soaping and to light. A print of very similar strength is obtained if the steaming is carried out at 100° C. with moist steam.

The dyestuff is superior to the somewhat similar water-soluble dyestuff of line 47, page 4, of British Specification No. 237,739 in that it shows less variation in tinctorial value according as to whether the print is steamed under moist or dry steaming conditions.

The following table shows the shades produced on acetate artificial silk by some other couplings. These compounds had the superior properties of the compounds described in the foregoing examples.

| No. | Diazo component | Coupling component | Shade on acetate artificial silk |
|---|---|---|---|
| 1 | p-Nitroaniline | Succinic ester of 1-N-n-butyl-3-hydroxy-7-chloro-1:2:3:4-tetrahydroquinoline. | Bluish-red. |
| 2 | do | Succinic ester of 1-N-benzyl-3-hydroxyethyl-1:2:3:4-tetrahydroquinoline. | Red. |
| 3 | 2:4-dinitro-aniline | Succinic ester of N-ethyl-N-β-hydroxy-ethylaniline. | Very bluish-red. |
| 4 | 2:6-dichloro-4-nitroanaline | do | Orange-brown. |
| 5 | 2:4-dinitroaniline | Succinic ester of N-n-butyl-N-β-hydroxy-ethyl-m-toluidine. | Reddish-violet. |
| 6 | 6-dichloro-2:4-dinitroaniline | do | Violet. |
| 7 | 2:4-dinitroaniline | Succinic ester of di-(N-β-hydroxyethyl)-m-toluidine (made from 1 mole of di-(N-β-hydroxyethyl)-m-toluidine and 1 mole of succinic anhydride). | Reddish-violet. |
| 8 | o-Chloro-p-nitroaniline | Succinic ester of N-ethyl-N-γ-chloro-β-hydroxy propylaniline. | Bluish-red. |
| 9 | 6-bromo-2:4-dinitroaniline | Succinic ester of N-ethyl-β-hydroxy-ethylaniline. | Reddish-violet. |
| 10 | 6-chloro-2:4-dinitroaniline | Succinic ester of 1-N-n-butyl-3-hydroxy-7-methyl-1:2:3:4-tetrahydroquinoline. | Reddish-blue. |
| 11 | 2:4-dinitroaniline | do | Bluish-violet. |
| 12 | p-Nitroaniline | Succinic ester of N-ethyl-N-γ-hydroxy-propylaniline. | Yellowish-red. |
| 13 | o-Chloro-p-nitroaniline | do | Bluish-red. |
| 14 | p-Nitroaniline | Monomethylsuccinic ester of N-ethyl-β-hydroxyethylaniline. | Yellowish-red. |
| 15 | do | Succinic ester of N-methyl-β-hydroxy-ethylaniline. | do |
| 16 | do | Succinic ester of N-benzyl-N-β-hydroxyethylaniline. | do |
| 17 | o-Bromo-p-nitroaniline | do | Bluish-red. |
| 18 | 2:4-dinitro | Succinic ester of N-n-butyl-N-β-hydroxyethyl-m-chloroaniline. | Reddish-violet. |
| 19 | o-Chloro-p-nitroaniline | do | Bluish-red. |
| 20 | 2:4-dinitroaniline | Succinic ester of N-cyclohexyl-N-β-hydroxyethyl-m-toluidine. | Reddish-violet. |
| 21 | p-Nitroaniline | Succinic ester of N-β-hydroxy-ethyldiphenylamine. | Yellowish-red. |
| 22 | 5-chloro-2:4-dinitroaniline | Succinic ester of N-n-butyl-N-β-hydroxy ethyl-m-toluidine. | Violet. |

In the specification and claims, unless otherwise specifically indicated, the term alkyl when used alone or in the terms, aralkyl, hydroxyalkyl and cycloalkyl, means a straight chain saturated hydrocarbon group having 1 to 6 carbons, such as methyl, ethyl, propyl and butyl. The term aryl as a substituent group refers to a single benzene or naphthalene group which is not substituted by other groups unless such a substituent is specifically indicated. The term aralkyl refers to substituent groups having a $C_nH_{2n}$ aliphatic group and an aromatic radical, such as

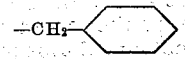

Hydroxyalkyl refers to substituent groups in which alkyl has one hydroxy group such as hydroxyethyl, hydroxypropyl and hydroxybutyl and in which the hydroxyl may be connected to any carbon of the alkyl radical. The term cycloalkyl refers to substituent groups consisting of a ring of methylene groups, one or more of which groups may carry methyl alkyl substituents. The following are illustrations of such groups, cyclohexyl, methylcyclohexyl and ethylcyclohexyl.

As illustrations of other straight and branched chain dicarboxylic acids having the formula $HO_2C-C_nH_{2n}-CO_2H$ the following are mentioned, pimelic and α-ethyl glutaric acids.

Instead of N-ethyl-gamma-chloro-beta-hydroxypropylaniline, other mono-halogenated derivatives can be used, such as N-ethyl-gamma-bromo-beta-hydroxypropylaniline. The aniline nucleus of these compounds may be substituted by alkyl or halogen in the ortho or meta positions to the amino group.

Since from the foregoing description of the invention it will be apparent to those skilled in the art that various other embodiments of the invention may be made without departing from the spirit and scope thereof, it is to be understood that no limitations are intended except those which are specifically recited in the annexed claims or are imposed by the prior art.

I claim:

1. A compound represented by the formula

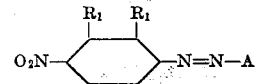

in which R is one of a group consisting of hydrogen, nitro and halogen; one $R_1$ is hydrogen and the other $R_1$ is a member of the group consisting of hydrogen, nitro and halogen, no more than one nitro group being present among the R and R' groups; A is the residue after coupling of a coupling component of one of a group consisting of ammonia and alkali metal salts of dicarboxylic acid half-esters represented by the formulae

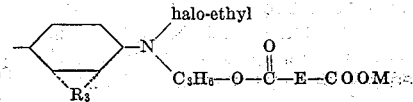

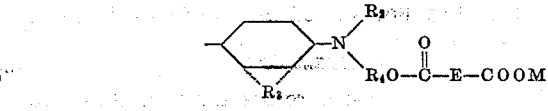

and

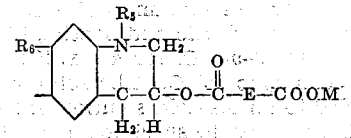

wherein $R_2$ is a member of the group consisting of alkyl, monohydroxyalkyl, phenyl, naphthyl, phenyl-alkyl, cyclohexyl and alkyl-cyclohexyl, wherein alkyl in said members has 1 to 6 carbons, $R_3$ is one of a group consisting of hydrogen, alkyl having 1 to 6 carbons and halogen; $R_4$ is an alkylene group having 2 to 3 carbons; $R_5$ is a member of the group consisting of alkyl, phenyl-alkyl and naphthyl-alkyl wherein alkyl in said members has 1 to 6 carbons; $R_6$ is a member of the group consisting of hydrogen, alkyl having 1 to 6 carbons and halogen; the group

is the residue after esterification of a dicarboxylic acid of the group consisting of maleic acid, and straight and branched chain aliphatic acids having a formula $HO_2C-C_nH_{2n}-CO_2H$ wherein $n$ is 2 to 6; and M is one of a group consisting of hydrogen, ammonia and the alkali metals, the azo group being para to nitrogen.

2. The azo dyestuff which in the form of its acid is represented by the formula

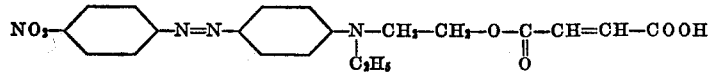

3. The azo dyestuff which in the form of its acid is represented by the formula

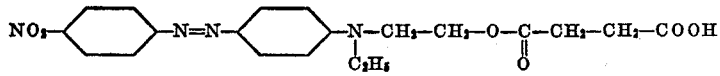

4. The azo dyestuff which in the form of its acid is represented by the formula

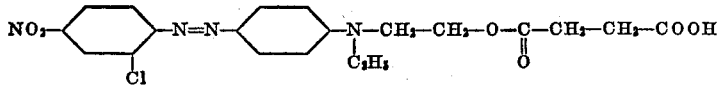

5. The process which comprises mixing with a dry inert liquid medium; a monoazo compound represented by the formula

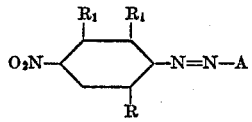

in which R is one of a group consisting of hydrogen, nitro and halogen, one $R_1$ is hydrogen and the other $R_1$ is one of a group consisting of hydrogen, nitro and halogen, no more than one nitro group being present among the R and R' groups, A is the residue after coupling of a coupling component of one of a group consisting of the compounds represented by the formulae

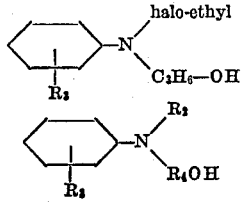

and

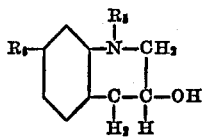

wherein $R_2$ is one of a group consisting of alkyl, mono-hydroxy-alkyl, phenyl, naphthyl, phenyl alkyl, cyclohexyl and alkyl-cyclohexyl wherein alkyl has 1 to 6 carbons, $R_3$ is one of a group consisting of hydrogen, alkyl having 1 to 6 carbons and halogen and is substituted in an ortho or meta position to the amino group, $R_4$ is an alkylene group having 2 to 3 carbons, $R_5$ is one of a group consisting of alkyl, phenyl alkyl and naphthyl alkyl wherein alkyl has 1 to 6 carbons, $R_6$ is one of a group consisting of hydrogen, alkyl having 1 to 6 carbons and halogen, the coupling in said monoazo compound being para to nitrogen; and the anhydride of an acid of the group consisting of maleic acid and the aliphatic dicarboxylic acids having a formula $HO_2C-C_nH_{2n}-COOH$ in which $n$ is 2 to 6, said anhydride being sufficient in amount to form only a half-ester with said product of coupling; heating the mixture until a half-ester is formed; and separating the resulting carboxylic acid half-ester of said azo compound from the mixture.

6. The process which comprises esterifying a compound represented by the formula para-nitroaniline→N-ethyl-N-β-hydroxyethylaniline in a dry inert medium by heating said mixture with sufficient maleic anhydride to form an acid half-ester of said azo compound and separating the half-ester from the esterifying medium.

ARTHUR HOWARD KNIGHT.

CERTIFICATE OF CORRECTION.

Patent No. 2,351,133.                               June 13, 1944.

ARTHUR HOWARD KNIGHT.

It is hereby certified that error appears in the printed specification of the above numbered patent requiring correction as follows: Page 4, in the table, second column thereof, opposite Example No. 6, for "6-dichloro-2:4-dinitroaniline" read --6-chloro-2:4-dinitroaniline--; and that the said Letters Patent should be read with this correction therein that the same may conform to the record of the case in the Patent Office.

Signed and sealed this 12th day of September, A. D. 1944.

Leslie Frazer (Seal)                    Acting Commissioner of Patents.